US010255324B2

United States Patent
Agrawal et al.

(10) Patent No.: US 10,255,324 B2
(45) Date of Patent: *Apr. 9, 2019

(54) QUERY MODIFICATION IN A DATABASE MANAGEMENT SYSTEM

(71) Applicant: International Business Machines Corporation, Armonk, NY (US)

(72) Inventors: Sheshnarayan Agrawal, Bangalore (IN); Azad Khan, Bangalore (IN); Kapish Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,769

(22) Filed: Feb. 3, 2017

(65) Prior Publication Data

US 2018/0225330 A1  Aug. 9, 2018

(51) Int. Cl.
*G06F 17/30* (2006.01)

(52) U.S. Cl.
CPC .. *G06F 17/30474* (2013.01); *G06F 17/30448* (2013.01); *G06F 17/30463* (2013.01); *G06F 17/30457* (2013.01)

(58) Field of Classification Search
CPC ........... G06F 11/0781; G06F 17/30427; G06F 17/30433; G06F 17/30442; G06F 17/30448; G06F 17/30457; G06F 17/30463; G06F 17/30471; G06F 17/30474; G06F 17/30395; G06F 17/30469; G06F 17/30507; G06F 17/3051; G06F 17/30536; G06F 17/30551; G06F 17/30929; G06F 17/30979

See application file for complete search history.

(56) References Cited

U.S. PATENT DOCUMENTS

| 7,587,383 | B2 | 9/2009 | Koo et al. |
| 7,685,194 | B2 * | 3/2010 | Kabra ............... G06F 17/30306 707/714 |
| 8,332,388 | B2 | 12/2012 | Chaudhuri et al. |
| 8,775,412 | B2 * | 7/2014 | Day .................. G06F 17/30595 707/718 |

(Continued)

OTHER PUBLICATIONS

Stillger, Michael, et al. "LEO-DB2's learning optimizer." VLDB. vol. 1. 2001. (Year: 2001).*
IBM, List of IBM Patents or Patent Applications Treated as Related, Appendix P, dated Sep. 22, 2017, 2 pages.

(Continued)

*Primary Examiner* — Mark D Featherstone
*Assistant Examiner* — Diedra McQuitery
(74) *Attorney, Agent, or Firm* — Tihon Poltavets

(57) ABSTRACT

Disclosed aspects relate to automated query modification in a database management system (DBMS). A triggering event related to an execution of a query may be detected by an automated query modification engine. A query modification operation may be determined by the automated query modification engine based on a nature of the triggering event. The query modification operation may be determined to debug the triggering event related to the execution of the query. The query modification operation may be carried-out by the automated query modification engine. The query modification operation may be carried-out to modify the query to debug the triggering event related to the execution of the query.

17 Claims, 8 Drawing Sheets

(56) References Cited

U.S. PATENT DOCUMENTS

| | | | |
|---|---|---|---|
| 9,009,140 B2 | 4/2015 | Chen et al. | |
| 9,213,740 B2 | 12/2015 | Andrei et al. | |
| 2002/0198867 A1* | 12/2002 | Lohman | G06F 17/30469 |
| 2008/0177722 A1* | 7/2008 | Lohman | G06F 17/30979 |
| 2009/0100004 A1* | 4/2009 | Andrei | G06F 17/30424 |
| 2009/0216710 A1* | 8/2009 | Chang | G06F 17/30672 |
| 2010/0043057 A1 | 2/2010 | Di Battista et al. | |
| 2010/0082603 A1* | 4/2010 | Krompass | G06F 17/30463 707/719 |
| 2011/0035369 A1* | 2/2011 | Halasipuram | G06F 17/30474 707/720 |
| 2012/0259850 A1* | 10/2012 | Liu | G06F 17/30705 707/737 |
| 2012/0259851 A1 | 10/2012 | Liu et al. | |
| 2013/0085984 A1* | 4/2013 | Burger | G06F 17/30471 707/609 |
| 2014/0095469 A1* | 4/2014 | Chen | G06F 17/30466 707/714 |
| 2014/0324882 A1 | 10/2014 | Giovanni et al. | |

OTHER PUBLICATIONS

Pending U.S. Appl. No. 15/700,363, filed Sep. 11, 2017, entitled: "Query Modification in a Database Management System", 57 pages.
International Business Machines Corporation; "Enabling automatic query rewrite"; IBM Knowledge Center; <http://www.ibm.com/support/knowledgecenter/SSEPEK_11.0.0/perf/src/tpc/db2z_enableaqrspecialregisters.html>.
International Business Machines Corporation; "Query rewrite optimization guidelines"; IBM Knowledge Center; <http://www.ibm.com/support/knowledgecenter/SSEPGG_9.5.0/com.ibm.db2.luw.admin.perf.doc/doc/c0024525.html>.
International Business Machines Corporation; "Query rewriting methods and examples"; IBM Knowledge Center; <http://www.ibm.com/support/knowledgecenter/en/SSEPGG_9.7.0/com.ibm.db2.luw.admin.perf.doc/doc/c0005293.html>.
International Business Machines Corporation; "An Overview of the IBM Informix Dynamic Server Optimizer"; <ftp://public.dhe.ibm.com/software/dw/dm/informix/0211desai/0211desai.pdf>.
Pirahesh et al.; "Extensible/Rule Based Query Rewrite Optimization in Starburst"; <http://citeseerx.ist.psu.edu/viewdoc/download?doi=10.1.1.99.9552&rep=rep1&type=pdf>.

* cited by examiner

QUERY MODIFICATION IN A DATABASE MANAGEMENT SYSTEM

BACKGROUND

This disclosure relates generally to database management systems and, more particularly, relates to automated query modification in a database management system. Databases are used to store information for numerous types of applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of DBMSs with respect to processing searches, or queries, to databases.

SUMMARY

Aspects of the disclosure relate to automatically rewriting a query in a database management system (DBMS). A query may be run and encounter an error with respect to memory or processing time. The query may be parsed and analyzed to determine a query modification operation. In embodiments, the query may contain redundant code which may need to be removed from the query. The query may be written in a challenging fashion and may need to be rewritten. The optimizer of a database may create a different plan for execution of the query. The plan may be executed by an automated query modification engine.

Aspects of the disclosure relate to automated query modification in a database management system (DBMS). A triggering event related to an execution of a query may be detected by an automated query modification engine. A query modification operation may be determined by the automated query modification engine based on a nature of the triggering event. The query modification operation may be determined to debug the triggering event related to the execution of the query. The query modification operation may be carried-out by the automated query modification engine. The query modification operation may be carried-out to modify the query to debug the triggering event related to the execution of the query.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
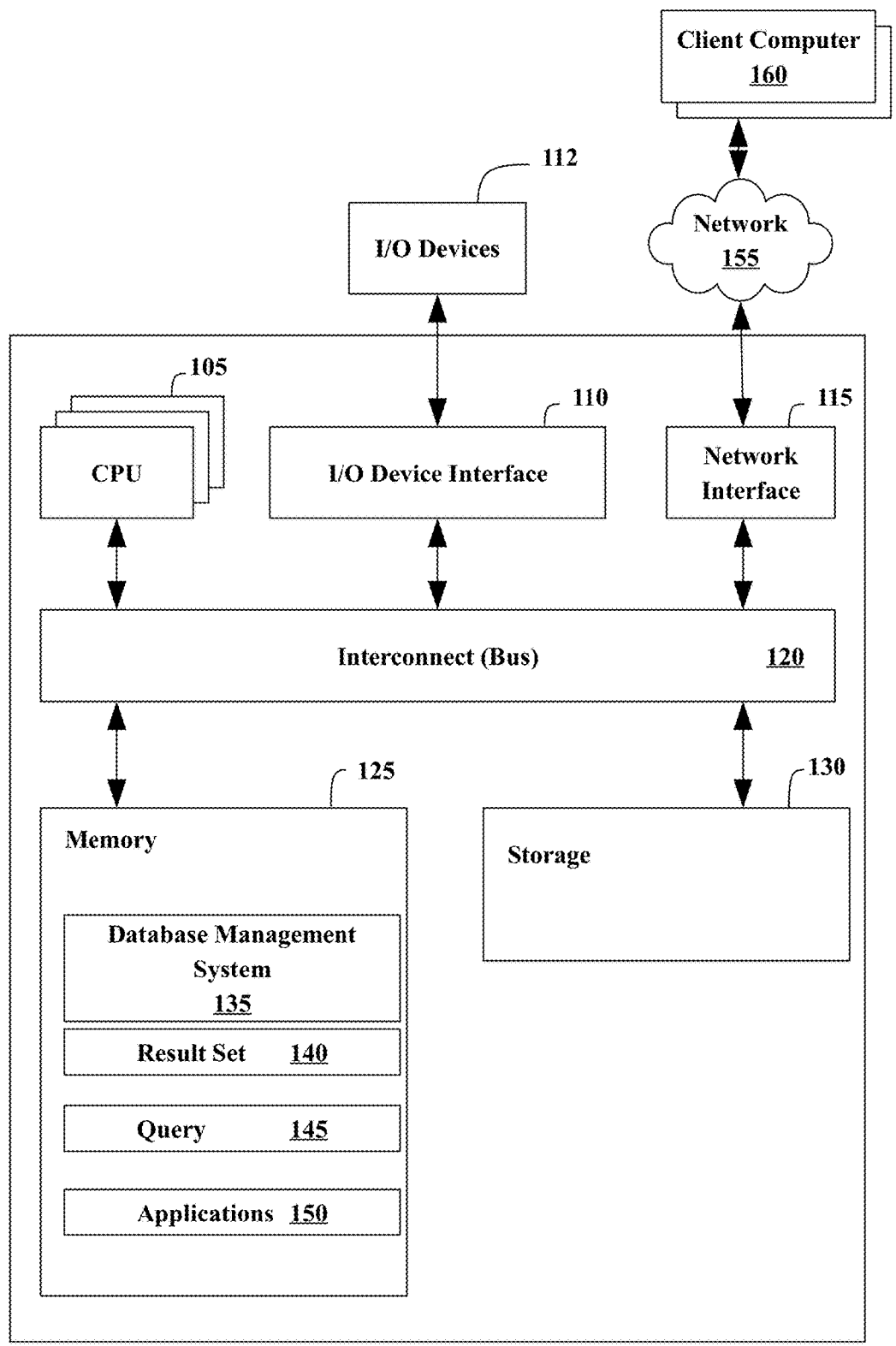
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to automatically rewriting a query in a database management system (DBMS). A query may be run and encounter an error with respect to memory or processing time. The query may be parsed and analyzed to determine a query modification operation. In embodiments, the query may contain redundant code which may need to be removed from the query. The query may be written in a challenging fashion and may need to be rewritten. The optimizer of a database may create a different plan for execution of the query. The plan may be executed by an automated query modification engine.

DBMSs can be used to access information stored in databases and often require significant resources to handle heavy workloads. As the use of DBMSs increases, there may be a desire to increase the performance of DBMSs with respect to processing searches, or queries. Relational databases may organize information into pre-defined tables and may typically be accessed using a standard language called Structure Query Language (SQL). The use of relational databases may improve processing efficiency and simplify the creation, organization, and extension of information within a database. There may be a desire to optimize queries through the execution of particular searches in an automated manner to minimize the amount of resources required to execute a query. Queries may be written in a subpar-fashion and may result in a high execution time and low performance. Aspects of the disclosure relate to the recognition that, in certain circumstances, manual intervention may be utilized to rewrite the query completely or to modify a part of the query. Automated query modification may reduce the amount of manual intervention needed to run a query.

In a database, there may be different system-level variables whose values may be used to create execution plans. The optimizer of a database may create many plans before making a selection (e.g., the plan with the lowest estimated cost). In some cases, a query execution plan may fail due to memory error, a high execution time, or other reasons. Automated query modification may reduce the amount of manual intervention as a result of query failure. The optimizer of a database may detect the problematic part of a query, rewrite it, and generate new execution plans to run the query. A piece of code in SQL may be analyzed for evaluation, and parts of the query which are unnecessary may be eliminated. Similar queries may be grouped together and similar optimization operations may be performed on these similar queries. Failed queries and their rewritten versions may be logged for the optimization of future queries.

Aspects of the disclosure include a method, system, and computer program product for automated query modification in a DBMS. A triggering event related to an execution of a query may be detected by an automated query modification engine. A query modification operation may be determined by the automated query modification engine based on a nature of the triggering event. The query modification operation may be determined to debug the triggering event related to the execution of the query. The query modification operation may be carried-out by the automated query modification engine. The query modification operation may be carried-out to modify the query to debug the triggering event related to the execution of the query.

In embodiments, analyze the triggering event can be analyzed related to the execution of the query and the nature of the triggering event may be ascertained. In various embodiments, an execution error event can be detected. In various embodiments, features may compare an execution temporal period with a threshold temporal period value. In various embodiments, a set of redundant code components can be identified. In certain embodiments, a set of historical run-time detail data may be analyzed to ascertain the nature of the triggering event. In embodiments, features may generate a set of candidate query plans to carry-out the query modification operation. In certain embodiments, the query can be parsed to search for a set of candidate nested code. In certain embodiments, the query may be parsed to search for a set of candidate superfluous code. Altogether, aspects of the disclosure may provide performance or efficiency benefits for query modification in a database management system. Aspects may save resources such as bandwidth, processing, or memory. As an example, automated query modification may save processing. Without automated query modification, a user may have to search for at least a portion of a query that is written in an inefficient fashion and manually modify (e.g., rewrite, remove) the query. The searching and modifying may require additional processing. Automated query modification may require less processing since a user may not have to search and modify manually. Other methods of saving processing may also be possible.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
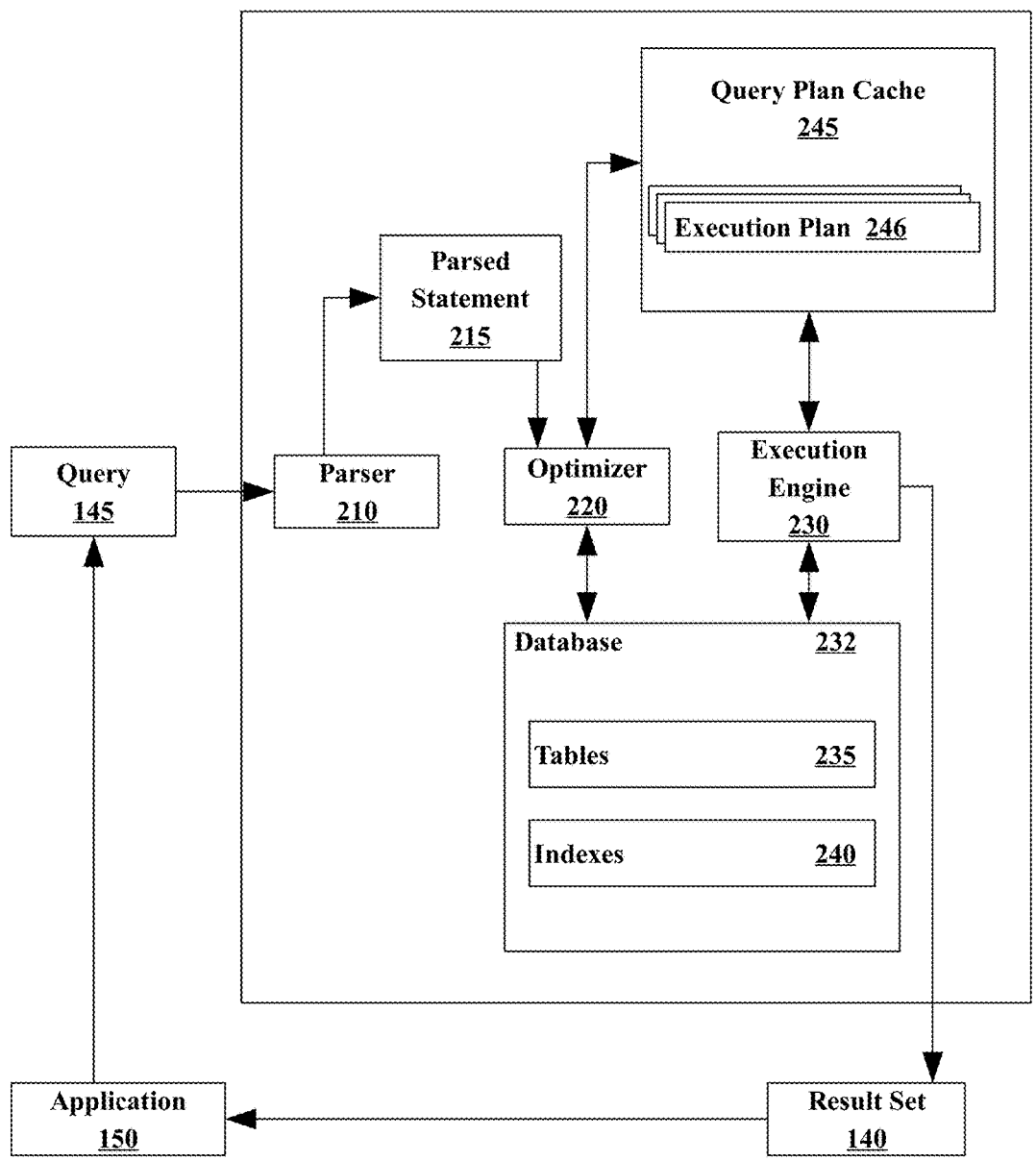
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
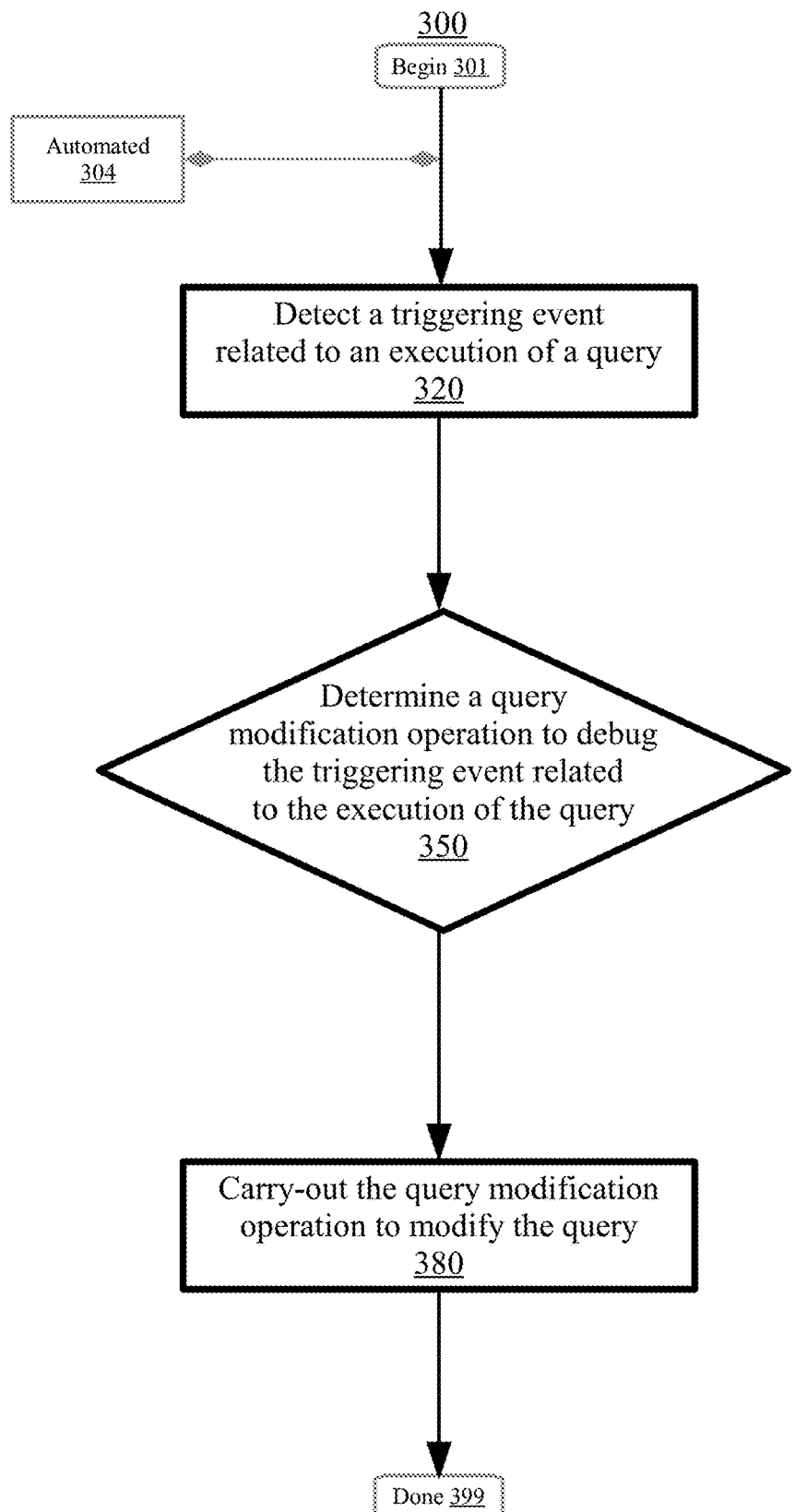
FIG. 3 is a flowchart illustrating a method for automated query modification in a DBMS, according to embodiments.

FIG. 3 is a flowchart illustrating a method 300 for automated query modification in a DBMS. Aspects of FIG. 3 relate to using a query modification engine to automatically manage the execution of a query. The method 300 may begin at block 301. In embodiments, the detecting, the determining, the carrying-out, and the other steps described herein may each be performed in an automated fashion without user intervention at block 304. The detecting, the determining, the carrying-out, and the other steps described herein may be carried out by an external query modification module hosted by a remote computing device or server. In this way, aspects of query modification may be performed using automated computing machinery without manual action. Other methods of performing the steps described herein may also be possible.

At block 320, a triggering event related to an execution of a query may be detected. An automated query modification engine may perform the detecting. Generally, detecting can include sensing, discovering, collecting, or otherwise recognizing a triggering event related to an execution of a query. The triggering event may be an occurrence which results in a query execution or more specifically a failure of a query execution. The triggering event may be memory-related. The triggering event may include exceeding a memory usage threshold. The memory usage threshold may include exceeding a predetermined, expected, average, or other value. In embodiments, the triggering event can include a memory failure (e.g., an error within a memory chip which prevents the query from being executed, a system-level error which causes a glitch in query execution). The triggering event may be associated with an execution time. The actual execution time of a query may be compared with a threshold to determine whether the triggering event has occurred. The actual execution time may exceed the threshold which indicates that the triggering event has occurred. The threshold execution time can be a benchmark value, predetermined value, or average value for a particular query, a specific type of query, or the like.

At block 350, a query modification operation may be determined. The automated query modification engine may perform the determining. Generally, determining can include resolving, computing, formulating, analyzing, identifying, evaluating, or otherwise ascertaining a query modification operation. The determining may be performed based on a nature of the triggering event. The nature of the triggering event may include a kind, type, or flavor of the triggering event (e.g., memory error event, high execution time, redundant code components). In certain embodiments, a specific type of memory error event, a specific type of temporal error event, or a specific type of redundant code components may occur. The query modification operation may be determined to debug (e.g., address, combat, engage, counteract, thwart, negate, offset, neutralize, rectify, frustrate, stymie, take care of, medicate, fix, mend) the triggering event related to the execution of the query. The query modification operation may include a process, action, algorithm, command, or the like which rewrites, changes, or revises the query (e.g., altering the syntax of a command as part of a query, eliminating a segment of redundant code as part of a query).

At block 380, the query modification operation may be carried-out. The automated query modification engine may perform the carrying-out. Generally, carrying-out can include performing, implementing, initiating, instantiating, or otherwise executing the query modification operation. The query may be modified (e.g., changed, revised, rewritten, simplified, altered) to debug the triggering event related to the execution of the query. The query modification operation may include configuring, programming, adjusting, fixing, addressing, changing, or otherwise revising the query.

Consider the following example. The manager of a store may use a query which is automatically run overnight to generate a report regarding cash register transactions. The manager may use a DBMS which utilizes an automated query modification engine. The query may automatically be executed to generate a list of transactions (e.g., LIST Transactions). The DBMS may generate a list of all transactions from the entire year instead of only transactions from the previous day. Searching for transactions in this way may use a large amount of memory with respect to gigabytes (GB). The amount of memory used (e.g., 10 GB) may exceed a threshold of memory usage (e.g., a threshold value of 7 GB) which is allocated to this task (which can lead it to fail based on how many other queries are running at a given time). The automated query modification engine may determine a query modification operation to simplify or revise the query to use less memory. The automated query modification engine may determine that memory can be saved by listing only transactions from the previous day. The query modification operation may be automatically revised to only list transactions from the previous day (e.g., LIST Transactions_Within_24_Hours). Executing the query in this way may save memory (e.g., utilize 5 GB of memory). Other methods of determining and carrying-out a query modification operation based on the detection of a triggering event related to an execution of a query may also be possible.

Method 300 concludes at block 399. As described herein, aspects of method 300 relate to automated query modification in a DBMS. Aspects of method 300 may provide performance or efficiency benefits related to automated query modification. Aspects may save resources such as bandwidth, processing, or memory. As an example, automated query modification can save memory. A failed query may be a query which requires too much memory. The determined query modification operation may be an action which reduces the amount of memory required to run the query. Other examples of saving memory with automated query modification may also be possible.

Figure 4:
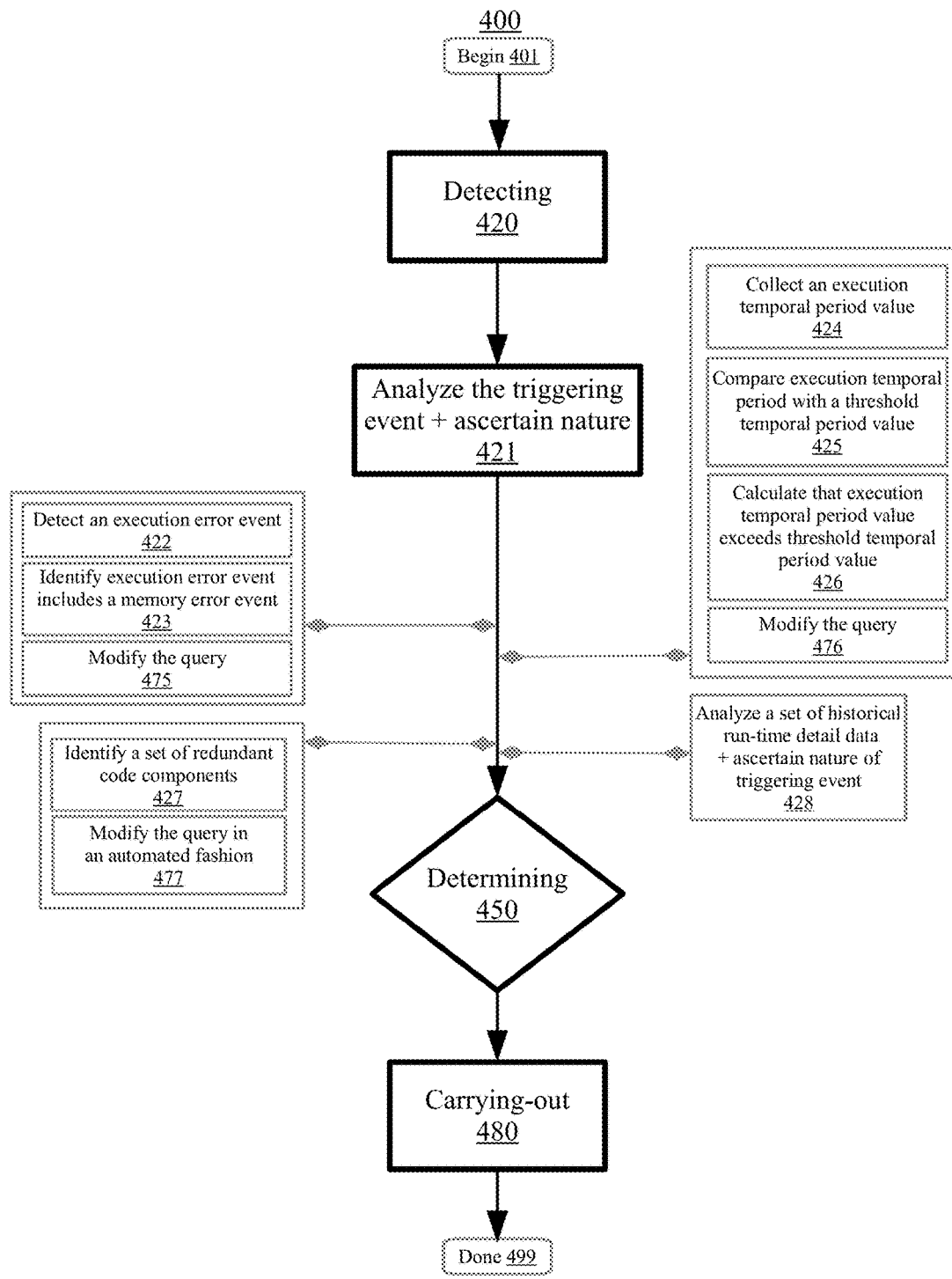
FIG. 4 is a flowchart illustrating a method for automated query modification in a DBMS, according to embodiments.

FIG. 4 is a flowchart illustrating a method 400 for automated query modification in a DBMS. Aspects of method 400 may be similar or the same as aspects of method 300, and aspects may be utilized interchangeably with one or more methodologies described herein. The method 400 may begin at block 401. At block 420, a triggering event related to an execution of a query may be detected. An automated query modification engine may perform the detecting. At block 450, a query modification operation may be determined. The automated query modification engine may perform the determining. The determining may be performed based on a nature of the triggering event. The query modification operation may be determined to debug the triggering event related to the execution of the query. At block 480, the query modification operation may be carried-out. The automated query modification engine may perform the carrying-out. The query modification operation may be carried-out to modify the query. The query may be modified to debug the triggering event related to the execution of the query.

At block 421, analyzing and ascertaining may occur. The analyzing and ascertaining may be performed by the automated query modification engine. The triggering event related to the execution of the query may be analyzed. Generally, analyzing may include comparing, contrasting, correlating, investigating, assessing, or otherwise examining the triggering event. Analyzing the triggering event may include assessing the amount of memory used, comparing the amount of processing time with a benchmark amount of processing time, examining the syntax of a code component for redundant code, examining the time at which the triggering event occurred, or the like. The automated query modification engine may analyze statistics or data (e.g., memory capacity used, run time, syntax, structure) logged in the database in order to analyze the triggering event (e.g., through comparisons/benchmarks) to determine the nature. The nature of the triggering event may be ascertained. Generally, ascertaining can include identifying, detecting, recognizing, sensing, or otherwise determining the nature of the triggering event. The nature of the triggering event may be ascertained through comparison with similar query triggering events, comparison with a benchmark value, examination of the syntax or structure of the query, or the like. The nature of the triggering event may include a type or kind of an occurrence related to memory usage, processing time, redundant code components, or a particular segment of code which causes challenges in execution.

Consider the following example. A cellular phone company may be conducting a recall on a particular model of cell phone experiencing battery leaks. The DBMS used by the company may automatically execute a query to search for cell phones with certain serial numbers (e.g., 350-358). A query may be executed to find all affected cell phones (e.g., SEARCH Model_B, Serial_Number_300s). The DBMS may structure the search query to find all cell phones of a particular model and sort based on serial numbers in the 300-range (e.g., DISPLAY Model_B, Serial_Number_300s). A triggering event related to the execution of this query may be detected. The triggering event may be analyzed. The query execution may utilize 20 GB of memory and last a duration of 15 seconds. A comparison may be made with benchmark statistics in this database. Query execution may typically utilize 22 GB of memory but only last a duration of 5 seconds. The amount of memory being used may not be the problem with the execution of the query. The amount of processing time may be the problem with the execution of the query due to the large difference between the execution time of the query and the average execution time of queries in general in this DBMS. The ascertained nature of the triggering event may be related to processing time and more particularly, may be related to exceeding an average value of processing time by 10 seconds. The query may be rewritten to save processing time (e.g., DISPLAY Model_B, Serial_Number_350s). The amount of processing time may be reduced. Other methods of analyzing the triggering event to ascertain a nature may also be possible.

In embodiments, an execution error event may be detected at block 422. The detecting may occur with respect to the execution of the query. Generally, detecting can include sensing, discovering, recognizing, or otherwise identifying an execution error event. An execution error event may include an occurrence, challenge, or activity related to the processing of a query which results in the query not being fully, truly, accurately, completely, or efficiently carried-out. In embodiments, it may be identified that the execution error event includes a memory error event at block 423. Generally, identifying can include sensing, recognizing, detecting, ascertaining, or otherwise determining that the execution error event includes a memory error event. The memory error event may include an occurrence, challenge, or activity with respect to memory usage which results in the failure of execution of a query (e.g., uses too much memory, uses all available memory, insufficient memory available). The detected execution error event may include an occurrence related to errors of performance memory (e.g., database performance challenges, hardware error), errors of functional memory (e.g., application program challenges, software error), or the like. In embodiments, the query may be modified to carry-out the query modification operation at block 475. Generally, modifying can include configuring, programming, adjusting, or otherwise revising the query to enhance query execution performance. The query may be modified in order to counter the memory error event.

Consider the following example. A college admissions office may use a DBMS to automatically search for high school students to contact about applying to the college. A query may be executed automatically to find all high school seniors in New England who achieved a certain score or higher on their SAT exam (e.g., FIND 1650_Above). The DBMS may structure the query to find all high school students in New England states who took the SATs, all high school seniors, and students who achieved a score of at least 1650 (e.g., DISPLAY Connecticut, Rhode_Island, Massachusetts, New_Hampshire, Vermont, Maine, Senior, 1650_Above). Searching for prospective applicants in this way may utilize a large amount of memory. The amount of memory used (e.g., 50 GB) may exceed a threshold level of memory (e.g., a threshold level of 25 GB). The automated query modification engine may determine a query modification operation to rewrite the query to reduce the amount of memory usage. The automated query modification engine may determine that memory can be saved by searching for students who achieved a score of 1650 or higher, students who are seniors, and students by region instead of state (e.g., DISPLAY 1650_Above, Senior, New_England). Executing the query in this way may save memory usage (e.g., reduce the memory usage to 22 GB). Other methods of identifying a memory error event to modify the query may also be possible.

In embodiments, an execution temporal period value may be collected at block 424. The collecting may occur with respect to the execution of the query. Generally, collecting can include sensing, discovering, detecting, recognizing, or otherwise receiving an execution temporal period value. The execution temporal period may be a variable which indicates an aspect of an execution of a triggering event which is related to time. The execution temporal period value may include a duration (e.g., how long the execution of a query takes), start time (e.g., what time the query started its execution), end time (e.g., how many seconds it took the query to fail), or the like. In embodiments, the execution temporal period may be compared with a threshold temporal period value at block 425. Generally, comparing can include contrasting, assessing, correlating, analyzing, investigating, or otherwise examining the execution temporal period and the threshold temporal period value. The threshold temporal period value may include a benchmark, an average, a time for which most queries should have finished by, a time for which a certain amount of queries should have finished by, or other threshold temporal period values. In embodiments, it may be calculated that the execution temporal period value exceeds the threshold temporal period value at block 426. Generally, calculating may include computing, formulating, estimating, or otherwise ascertaining that the execution temporal period value exceeds the threshold temporal period value (e.g., the execution time is too large). In embodiments, the query may be modified to carry-out the query modification operation at block 476. The query may be revised in order to modify the execution temporal period value.

Consider the following example. An emergency response center may dynamically (e.g., ongoing) store data from messages and phone calls in a database. Queries may be run to indicate which type of emergency response professionals to send (e.g., DETERMINE Fire, DETERMINE Police, DETERMINE Ambulance, DETERMINE Fire_Police, DETERMINE Fire_Police_Ambulance) and where to send them (e.g., FIND Location_Main_Street). Queries that should take 5 seconds may be taking 30 seconds, which may result in people not getting the necessary emergency help. The automated query modification engine may determine a query modification operation to rewrite the query to reduce the amount of processing time. The current query may be coded such that all locations with the same name may be listed (e.g., all Main Streets in the state, all Main Streets in the country). The query modification operation may automatically revise the query to only list locations with the same name within a ten-mile radius of the source of the call or message. Executing the query in this way may save processing time (e.g., reduce the processing time to 3 seconds). Other methods of collecting an execution temporal value to modify the query may also be possible.

In embodiments, a set of redundant code components of the query may be identified at block 427. Generally, identifying can include sensing, recognizing, detecting, ascertaining, or otherwise determining a set of redundant code components of the query. The set of redundant code components of the query may include a set of one or more repetitive statements (e.g., multiple returns, multiple loops), unnecessary syntax (e.g., unnecessary parentheticals), excessive commands (e.g., ADD 5 SUBTRACT 5), extra functions (e.g., SUBMIT Answer SUBMIT Answer), or the like. The set of redundant code components may include a segment of code which is unnecessary to the execution of the query (e.g., identical code, multiple of another code). In embodiments, the query may be modified to carry-out the query modification operation at block 477. The query may be modified in an automated fashion which correlates to the set of redundant code components. Generally, modifying can include configuring, programming, adjusting, or otherwise revising the query in an automated fashion (e.g., without manual/user intervention). The query may be rewritten in order to counter the set of redundant code components.

Consider the following example. A marketing coordinator of a company may use a DBMS which automatically searches for all women between the age of 22 and 30 who use a certain product. A query may be executed to find women in this age range who use the product (e.g., SEARCH Product_C, Female, Age_22_30). The DBMS may structure the search query to search for all users of the product, all female users of the product, all female users of the product below 50, all female users of the product below 30, and all female users of the product above 22 (e.g., DISPLAY Product_C, Female, Age_Below_50, Age_Below_30, Age_Above_22). The query execution may require a large amount of memory (e.g., 100 GB) and processing time (e.g., 200 seconds). The query may need to be rewritten to save memory and processing time. The query may be analyzed and a set of redundant code components may be identified. As an example, it may be unnecessary to reduce the set of female users to the set of female users under 50 and the set of female users under 30 simultaneously (since the set of female users under 30 is a subset of female users under 50 and female users under 30 are more relevant to this query). The automated query modification engine may determine a query modification operation to rewrite the query to eliminate the redundant code component (e.g., eliminate searching for female users under 50). The automated query modification engine may rewrite the query (e.g., DISPLAY Product_C, Female, Age_Below_30, Age_Above_22). Executing the query in this way may save memory usage (e.g., reduce the memory usage to 50 GB) and processing time (e.g., reduce the processing time to 30 seconds). Other methods of identifying a set of redundant code components of the query may also be possible.

In embodiments, analyzing and ascertaining may occur at block 428. The analyzing and ascertaining may be performed by the automated query modification engine. A set of historical run-time detail data may be analyzed. Generally, analyzing can include comparing, assessing, investigating, or otherwise examining a set of historical run-time detail data. The set of historical run-time detail data may be analyzed from database statistics. The set of historical run-time detail data may be based on a preceding run or runs, a failure reason or reasons of previous runs, a code component which caused failure in previous runs, or the like. The historical run-time detail data may include timestamps (e.g., the query was executed at 10:04:23 A.M), the query start time (e.g., execution started at 1:03 P.M), the time at which the query encountered an error (e.g., the query failed at 4:20 P.M.), when the query finished (e.g., the query finished at 8:40 P.M.), if the query finished (e.g., the query did not finish, the query did finish), any generated error messages (e.g., Memory Error, Processing Error), memory usage (e.g., which memory, how much memory used, when the memory was used), or the like. The set of historical run-time detail data may be analyzed with respect to the triggering event related to the execution of the query. The nature of the triggering event may be ascertained. The ascertaining may be based on the set of historical run-time detail data with respect to the triggering event related to the execution of the query. Generally, ascertaining can include sensing, recognizing, detecting, or otherwise determining the nature of the triggering event. The set of data associated with a triggering event may be compared to other triggering events (e.g., two specific code components which occur simultaneously generally experience a processing error) to ascertain the nature. The automated query modification engine may determine the nature through a process of elimination (e.g., the error could be processing or memory but the specific query being run generally does not experience processing errors so the error is related to memory) to ascertain the nature.

Consider the following example. A grocery store may automatically run a DBMS to search for food items (e.g., lettuce) undergoing a recall due to a potential contamination event. A query may be executed to find all customers who purchased a certain brand of lettuce in the month of June 2015 (e.g., SEARCH Green_Lettuce, June). The DBMS may structure the search query to search for all transactions in June of any year and the specific brand of lettuce (e.g., DISPLAY June, Green_Lettuce). The query may experience an error, and a set of historical run-time detail data may automatically be analyzed to determine the nature of the triggering event. The query may have been executed during the daytime while several other queries were being executed as well. Queries which are run during the daytime using the DBMS may experience memory errors due to an insufficient amount of available memory. The triggering event may be ascertained to be related to memory due to the time the query was executed (e.g., 9:30 A.M.). The query may be automatically rewritten to require less memory (e.g., reduce memory usage from 100 GB to 30 GB). The DBMS may structure the query to search for all transactions in June and more specifically in June 2015, as well as the specific brand of lettuce (e.g., DISPLAY June_2015, Green_Lettuce). The query may be executed and may utilize a smaller amount of memory (e.g., 30 GB). Other methods of analyzing a set of historical run-time detail data to ascertain the nature of a triggering event may also be possible.

Method 400 concludes at block 499. As described herein, aspects of method 400 relate to automated query modification in a DBMS. Aspects of method 400 may provide performance or efficiency benefits related to automated query modification. Aspects may save resources such as bandwidth, processing, or memory. As example, the use of a set of redundant code components to modify the query automatically may save processing time. A set of redundant code components may be automatically identified by the query modification engine and removed without user intervention. This may prevent a user from having to remove to redundant code components manually which may require additional processing time. Other examples of saving processing time may also be possible.

Figure 5:
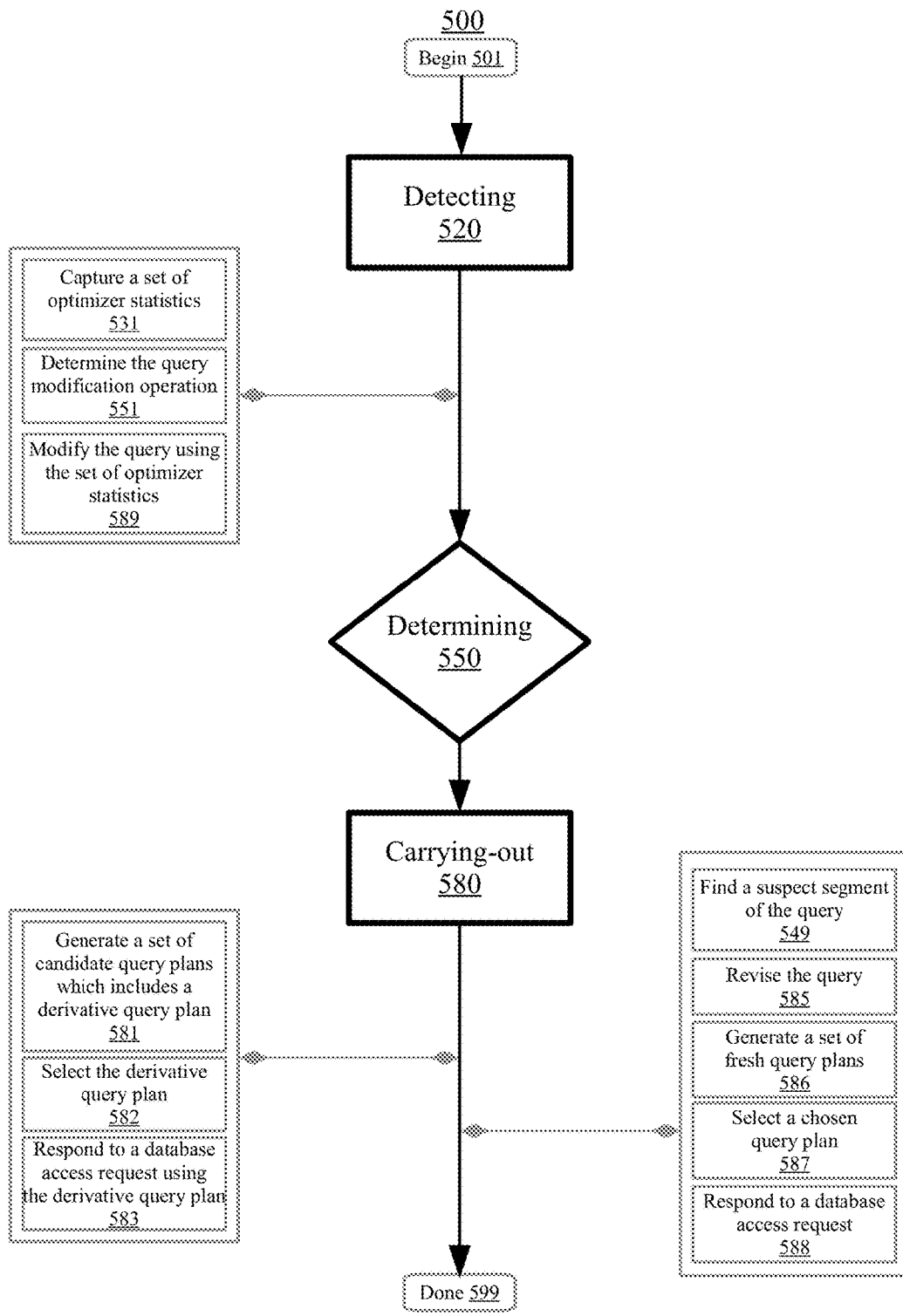
FIG. 5 is a flowchart illustrating a method for automated query modification in a DBMS, according to embodiments.

FIG. 5 is a flowchart illustrating a method 500 for automated query modification in a DBMS. Aspects of method 500 may be similar or the same as aspects of method 300/400, and aspects may be utilized interchangeably with one or more methodologies described herein. The method 500 may begin at block 501. At block 520, a triggering event related to an execution of a query may be detected. An automated query modification engine may perform the detecting. At block 550, a query modification operation may be determined. The automated query modification engine may perform the determining. The determining may be performed based on a nature of the triggering event. The query modification operation may be determined to debug the triggering event related to the execution of the query. At block 580, the query modification operation may be carried-out. The automated query modification engine may perform the carrying-out. The query modification operation may be carried-out to modify the query. The query may be modified to debug the triggering event related to the execution of the query.

In embodiments, a set of optimizer statistics may be captured at block 531. Generally, capturing can include retrieving, collecting, gathering, recording, obtaining, or otherwise acquiring a set of optimizer statistics. The set of optimizer statistics may relate to an optimizer of the DBMS. The set of optimizer statistics may include values, numbers, or other variables related to the execution of a query. The set of optimizer statistics may include disk utilization, duration of running time, type of memory used, number of distinct values, levels, clustering factors, frequency histograms, or other types of optimizer statistics. The optimization may be enabled with the registry variable to enable the rewrite. In embodiments, the query modification action may be determined at block 551. Generally, determining can include formulating, composing, computing, resolving, or ascertaining the query modification action as described herein. The determining may occur using the set of optimizer statistics. The optimizer statistics may be compared to data related to the execution of a particular query. The comparison may indicate a part of query which is causing an execution error (e.g., a redundant code component, an input error). The query modification operation may be determined to debug the triggering event related to the execution of the query. In embodiments, the query may be modified at block 589. Generally, modifying can include configuring, programming, adjusting, instructing, or otherwise revising the query as described herein. The modifying may occur in response to using the set of optimizer statistics to determine the query modification action. The query may be modified to carry-out the query modification operation.

Consider the following example. A graduate student may be using a DBMS to search for sources to write their thesis. The student may wish to view only magazine articles related to artificial intelligence written since 2013. The DBMS may execute a search query to find resources for the research paper. The DBMS may structure the query to search all sources from 2013 to the present, sources relating to artificial intelligence, and sources which are from magazines (e.g., DISPLAY 2013_Present, Artificial_Intelligence, Magazines). A triggering event related to the execution of the query may be detected. As an example, the execution of the query may require a large amount of memory (e.g., 400 GB). A set of optimizer statistics which relate to an optimizer of the DBMS may be captured. As an example, the amount of disk space being used may be 410 GB. The query may include three different levels. The query may be utilizing random-access memory. A query modification action may be determined using the set of optimizer statistics. The amount of memory used may need to be reduced. The query may need to be written to include less levels of search (e.g., two instead of three). The query may be modified to reduce the amount of memory used (e.g., DISPLAY Recent_Magazines, Artificial_Intelligence). The revised query may require a lower memory usage (e.g., 200 GB). Other methods of using a set of optimizer statistics to modify the query may also be possible.

In embodiments, a suspect segment of the query may be found at block 549. Generally, finding can include identifying, recognizing, discovering, detecting, sensing, extracting, or otherwise ascertaining a suspect segment of the query. The suspect segment may include a piece of a query which indicates problems related to running the query (e.g., a long running time, uses too much memory, causes a loop). The automatic query modification engine may compare statistics and data to determine a suspect segment. The identifying of a suspect segment may focus the automatic query modification engine on the specific piece of the query which needs to be revised (as opposed to revising the entire query). In embodiments, the query may be revised at block 585. Generally, revising can include editing, adjusting, generating, organizing, or otherwise modifying the query. The query may be revised by modifying the suspect segment (e.g., rewrite one or more SQL statements). In embodiments, a set of fresh query plans may be generated at block 586. Generally, generating can include computing, formulating, identifying, or otherwise determining a set of fresh query plans. The generating may occur in response to revising the query. A new group of processes for query execution may be formulated in response to the query revision. In embodiments, a chosen query plan may be selected at block 587. Generally, selecting can include choosing, electing, specifying, ascertaining, or otherwise designating a chosen query plan. The chosen query plan may be of the set of fresh query plans. The chosen query plan may be selected from the set of fresh query plans. Selecting may include the automated query modification engine flagging or marking a query plan as the one that will be executed (as opposed to other query plans). In embodiments, a database access request may be responded to at block 588. Generally, responding can include acknowledging, addressing, or otherwise reacting to a database access request as described herein. The responding may occur using the chosen query plan.

Consider the following example. A commercial store may need to use a DBMS to search for any customer who spent more than $100 in the past week to enter these customers into a promotional contest. A query may be automatically executed to find all customers in the last seven days with a transaction exceeding $100 (e.g., SELECT 7_days, 6_days, 5_days, 4_days, 3_days, 2_days, 1_day, $_100). The query may fail due a long duration of processing time (e.g., 5 minutes). A suspect segment of the query may be found. As an example, the query may include a segment of code which runs a loop seven times when the loop may only need to be run once (e.g., it may be unnecessary to list each of the days in the last week, the duration of 7 days encompasses the duration of 6 days/5 days). It may only be necessary to list the duration of seven days (e.g., 7_days). The suspect segment (e.g., 6_days, 5_days, 4_days, 3_days, 2_days, 1_day) may be modified (e.g., eliminated). A fresh set of query plans may be generated (e.g., sort by range of days and dollar amount, sort by range of days and products and dollar amount). A chosen query plan may be selected from the set of fresh query plans. The chosen query plan may include sorting transactions by range of days (e.g., last seven days) and by dollar amount (e.g., $100 or more). A database access request may be responded to using the chosen query plan. The query may be executed (e.g., SELECT 7_days, $_100). Other examples of revising a suspect segment of a query may also be possible.

In embodiments, a set of candidate query plans may be generated at block 581. Generally, generating can include compiling, arranging, assembling, creating, organizing, or otherwise composing a set of candidate query plans. The generating may occur in response to carrying-out the query modification operation to modify the query to debug the triggering event related to the execution of the query (as described herein). The set of candidate query plans may be selected by the optimizer. The optimizer may analyze different possible methods of running the query based on indexes, tables, statistics, or the like. The optimizer may be controlled with a session level switch (e.g., OPTIMIZER_QUERY_REWRITE set ON, OPTIMIZER_QUERY_REWRITE set OFF). The optimizer may determine candidate query plans by rewriting or revising a query or part of a query. The set of candidate query plans may include a derivative query plan. The derivative query plan may be both derived (e.g., computed, formulated, arising out of) from the query and based on the query modification operation (e.g., the result/output of the query modification operation). The derivative query plan may include a process or set of operations which is launched or initiated after changes or modifications to the query have been made. In embodiments, the derivative query plan may be selected from the set of candidate query plans at block 582. Generally, selecting can include choosing, electing, specifying, ascertaining, or otherwise designating the derivative query plan. The selecting may be based on an expectation that the derivative query plan is estimated to cost less than other candidate query plans in terms of time or computing resources (e.g., processor, memory). The optimizer may select the best (e.g., shortest run time, uses the least amount of memory) plan for query execution from the set of candidate query plans. The optimizer may flag or mark the chosen query plan as opposed to other query plans as described herein. In embodiments, a database access request may be responded to using the derivative query plan at block 583. Generally, responding can include acknowledging, addressing, or otherwise reacting to a database access request (e.g., a database query).

Consider the following example. A city may want to send an emergency alert to residents who live in a particular region of the city (e.g., New York City sending an emergency alert to residents of Chelsea). A query may be executed to generate a list of residents who currently live in Chelsea (e.g., LIST Chelsea). A list may be generated which includes any resident who has ever lived in Chelsea instead of only the residents currently living there. This may require a large amount of processing time (e.g., 60 minutes) which may exceed a threshold period of 5 minutes. A query modification operation may be established to rewrite the query to save processing time. The query may be rewritten to list only residents who currently live in Chelsea (e.g., LIST 2016, Chelsea). Automatically rewriting the query may save processing time (e.g., reduce the processing time to 5 minutes). A set of candidate query plans may be generated which includes sorting based on gender, sorting based on age, sorting based on street, sorting based on year, and sorting based on household income. The set of candidate query plans may include a derivative query plan. The derivative query plan may include rewriting the query to indicate the year (e.g., 2016) as described herein. The derivative query plan may be selected to respond to a database access request. Other methods of selecting a derivative query plan may also be possible.

Figure 6:
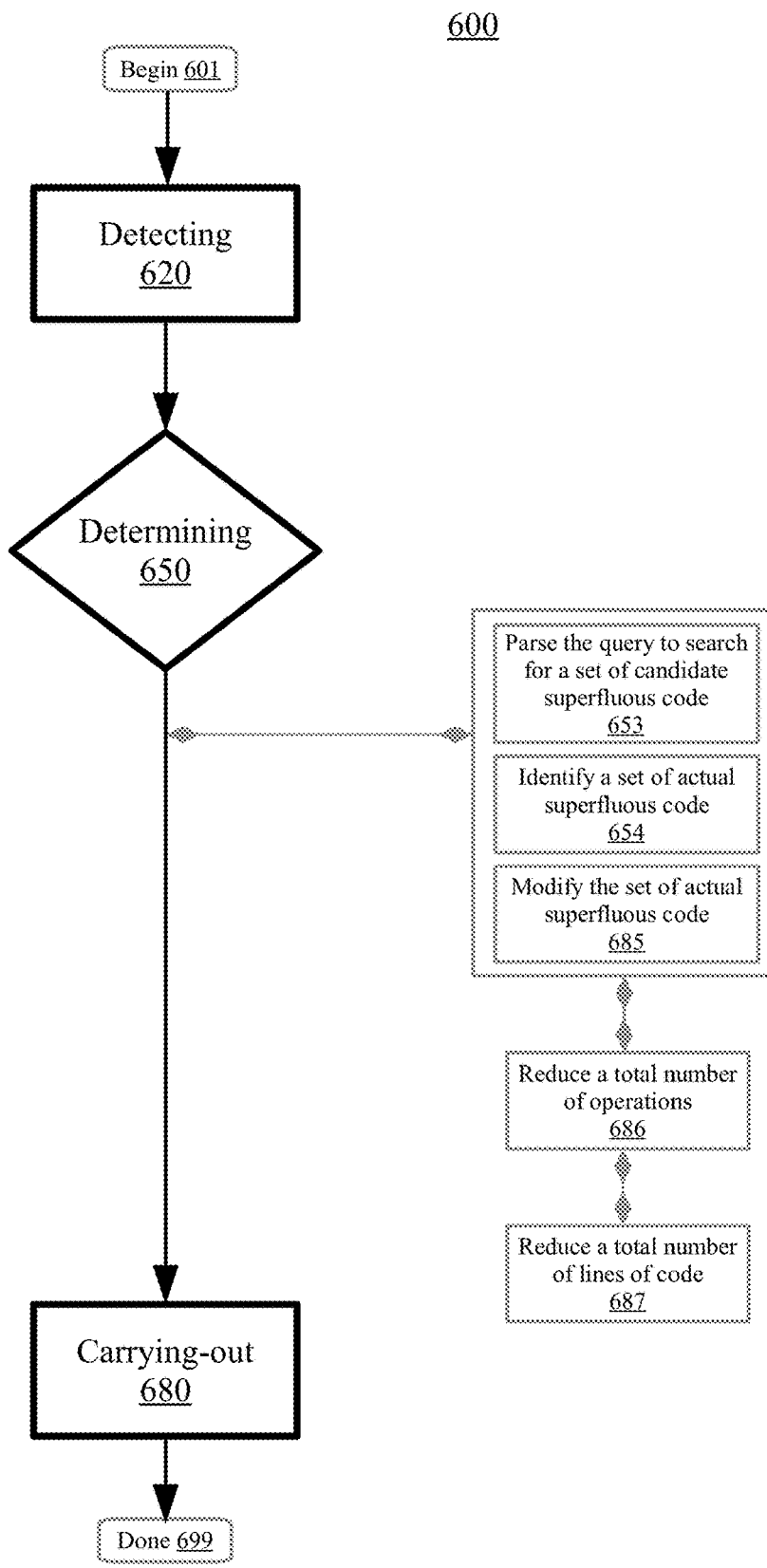
FIG. 6 is a flowchart illustrating a method for automated query modification in a DBMS, according to embodiments.

Method 500 concludes at block 599. As described herein, aspects of method 500 relate to automated query modification in a DBMS. Aspects of method 500 may provide performance or efficiency benefits related to automated query modification. Aspects may save resources such as bandwidth, processing, or memory. As an example, processing time may be saved by identifying a suspect segment of a query. The automatic query modification engine may identify a suspect segment of a query and modify this segment as part of a query modification operation. This may prevent the system from having to modify the entire query and may require less processing time. Other examples of saving processing time through automatic query modification may also be possible FIG. 6 is a flowchart illustrating a method 600 for automated query modification in a DBMS. Aspects of method 600 may be similar or the same as aspects of method 300/400/500, and aspects may be utilized interchangeably with one or more methodologies described herein. The method 600 may begin at block 601. At block 620, a triggering event related to an execution of a query may be detected. An automated query modification engine may perform the detecting. At block 650, a query modification operation may be determined. The automated query modification engine may perform the determining. The determining may be performed based on a nature of the triggering event. The query modification operation may be determined to debug the triggering event related to the execution of the query. At block 680, the query modification operation may be carried-out. The automated query modification engine may perform the carrying-out. The query modification operation may be carried-out to modify the query. The query may be modified to debug the triggering event related to the execution of the query.

In embodiments, the query may be parsed at block 653. Generally, parsing can include determining, resolving, dissecting, or otherwise analyzing the query. The query may be parsed in order to look at different parts of the query (e.g., different code components) and to search for a set of candidate superfluous code. The set of candidate superfluous code may be a piece of code which is unnecessary to the optimal running of the query (e.g., extra code component, unnecessary code component). The set of candidate superfluous code may utilize a set of computing resources (e.g., processor, memory). In embodiments, a set of actual superfluous code may be identified at block 654. Generally, identifying can include sensing, recognizing, resolving, detecting, ascertaining, or otherwise determining a set of actual superfluous code. The identifying may occur by analyzing the set of candidate superfluous code. The set of candidate superfluous code may utilize the set of computing resources. In embodiments, the set of actual superfluous code may be modified at block 685. Generally, modifying can include configuring, programming, adjusting, or otherwise revising the set of actual superfluous code. The modifying may occur to affect a utilization factor (e.g., number of operations, lines of code) of the set of computing resources.

In embodiments, a total number of operations to be performed by the query may be reduced at block 686. Generally, reducing can include lessening, decreasing, or otherwise diminishing the total number of operations. The operations may include function calls, comparisons, or the like (e.g., reducing a number of operations from 30 function calls to 10, reducing a number of comparisons from 42 to 17). The operations may be join operations, search operations, insert operations, count operations, logarithmic functions, random number functions, or other SQL functions. The reducing may occur by modifying the set of actual superfluous code.

In embodiments, a total number of lines of code may be reduced at block 687. Generally, reducing can include lessening, decreasing, or otherwise diminishing the total number of lines of code. The total number of lines of code may be reduced to decrease the amount of running time, memory usage, or the like (e.g., reducing a number of lines of code from 205 to 184). The reducing may occur by modifying the set of actual superfluous code. Reducing the total number of lines of code may include reducing the number of lines of code, the number of characters, the number of words, or the like.

Consider the following example. A hospital may use a DBMS to automatically process alerts from various rooms and floors (e.g., a surgeon is needed in the emergency room, a nurse is requested in the Intensive Care Unit immediately). The alerts may be stored in a DBMS and queries may be executed to indicate the type of medical professional needed (e.g., surgeon, nurse, technician) and the location where they are needed (e.g., critical care, surgery, oncology, emergency room). Queries that should take 2 seconds may be taking up to 60 seconds, which may result in various delays. The automated query modification engine may parse the query to search for a set of candidate superfluous code. The code may be written in such a way that certain code components may be unnecessary (e.g., the query runs the search for location three times when the search only needs to be executed once). The multiple location searches may be identified as a set of actual superfluous code. The superfluous code may be modified to reduce processing time. The modifying may include reduce a total number of lines of code. The code may be revised to search for a location only once as opposed to three times. The processing time for the query execution may be reduced from 60 seconds to 2 seconds. Other methods of parsing the query to search for a set of candidate superfluous code may also be possible.

Method 600 concludes at block 699. As described herein, aspects of method 600 relate to automated query modification in a DBMS. Aspects of method 600 may provide performance or efficiency benefits related to automated query modification. Aspects may save resources such as bandwidth, processing, or memory. As an example, memory may be saved by parsing the query for a set of candidate superlative code. The modification of the set of superfluous code may reduce the total number of operations or the total number of lines of code. Memory may be saved through the carrying-out of a smaller number of operations or lines of code. Other methods of saving memory may also be possible.

Figure 7:
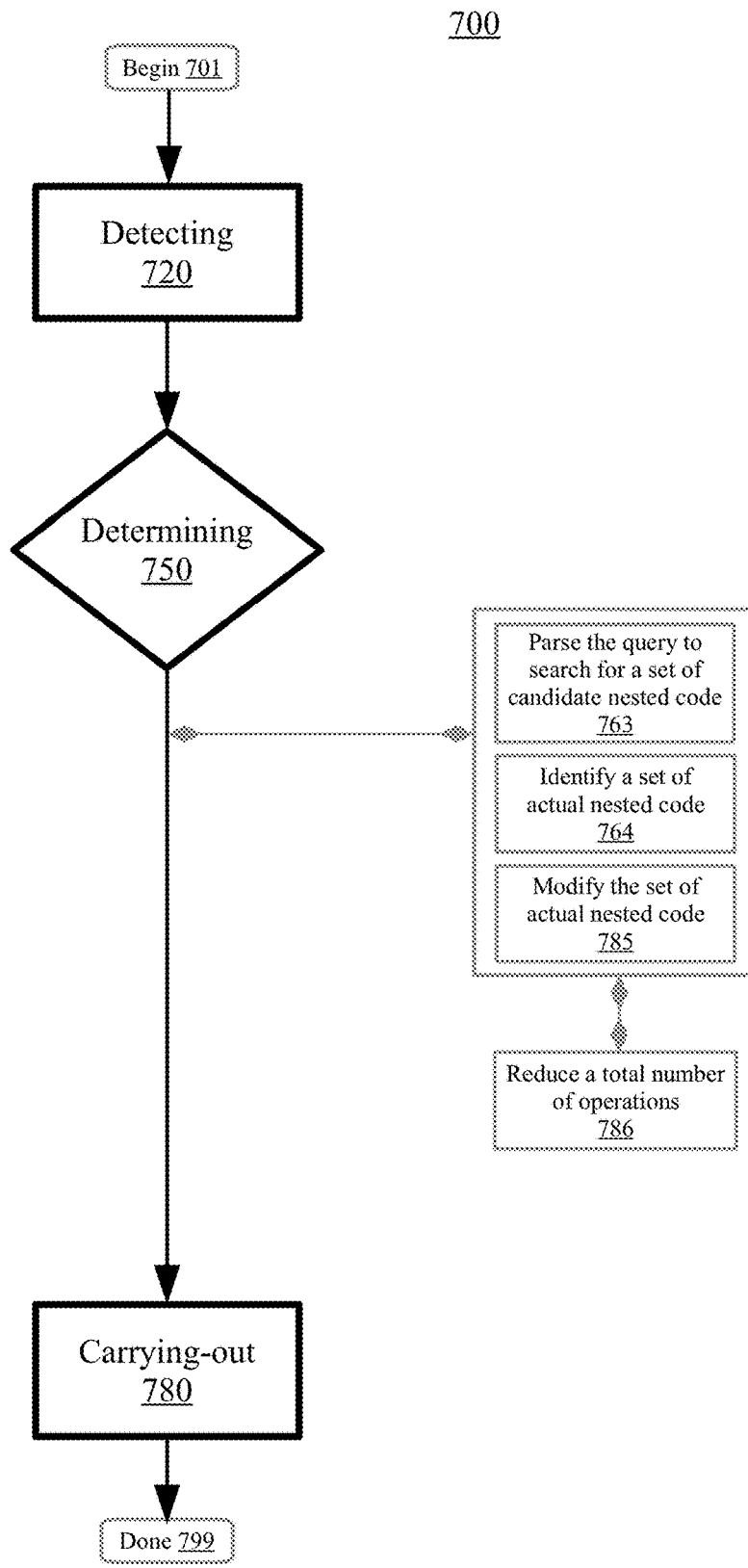
FIG. 7 is a flowchart illustrating a method for automated query modification in a DBMS, according to embodiments.

FIG. 7 is a flowchart illustrating a method 700 for automated query modification in a DBMS. Aspects of method 700 may be similar or the same as aspects of other methods described herein, and aspects may be utilized interchangeably with one or more methodologies described herein. The method 700 may begin at block 701. At block 720, a triggering event related to an execution of a query may be detected. An automated query modification engine may perform the detecting. At block 750, a query modification operation may be determined. The automated query modification engine may perform the determining. The determining may be performed based on a nature of the triggering event. The query modification operation may be determined to debug the triggering event related to the execution of the query. At block 780, the query modification operation may be carried-out. The automated query modification engine may perform the carrying-out. The query modification operation may be carried-out to modify the query. The query may be modified to debug the triggering event related to the execution of the query.

In embodiments, the query may be parsed at block 763. Generally, parsing can include determining, resolving, dissecting, or otherwise analyzing the query as described herein. The query may be parsed to search for a set of candidate nested code. The set of candidate nested code may include information or code organized in layers or levels which can run concurrently or simultaneously. The set of candidate nested code may be a level of code which is fully contained within another level of code, a code which performs a particular function contained within a code which performs a broader function, or the like. The set of candidate nested code may utilize the set of computing resources. In embodiments, a set of actual nested code may be identified at block 764. Generally, identifying can include sensing, recognizing, detecting, ascertaining, or otherwise determining a set of actual nested code. The identifying may occur by analyzing the set of candidate nested code. The set of candidate nested code may utilize the set of computing resources (e.g., processor, memory). In embodiments, the set of actual nested code may be modified at block 785. Generally, modifying can include configuring, programming, adjusting, or otherwise revising the set of actual nested code. The modifying may occur to affect a utilization factor of the set of computing resources. As an example, a set of candidate nested code may take less running time than a more linearly sequential set of code.

In embodiments, a total number of operations to be performed by the query may be reduced at block 786. Generally, reducing can include lessening, decreasing, or otherwise diminishing the total number of operations as described herein. The operations may include function calls or the like as described herein. The reducing may occur by modifying the set of actual nested code.

Consider the following example. A city may use a DBMS to issue a hurricane evacuation alert to certain counties. A query may be executed automatically to generate a list of all residents of three counties in a particular state. The query may fail due to a memory error (e.g., uses 250 GB of memory which exceeds a threshold of 100 GB). The query may be parsed to search for a set of candidate nested code. As an example, the query may be structured to search for residents by state, county, and town when it is only necessary to search for residents based on county. The "town" search level may be identified as an unnecessary set of nested code (e.g., a list of residents based on county does not require residents to be sorted based on town). The set of nested code may be modified to reduce the amount of memory being utilized. This may include reducing a total number of operations to be performed by the query. As an example, the operation "SORT Town" may be eliminated since only the operation "SEARCH state LIST county" is necessary (e.g., reducing number of operations from three operations to two operations). The amount of memory utilized by the query may be reduced from 250 GB to 93 GB. Other examples of parsing the query to search for a set of candidate nested code may also be possible.

Method 700 concludes at block 799. As described herein, aspects of method 700 relate to automated query modification in a DBMS. Aspects of method 700 may provide performance or efficiency benefits related to automated query modification. Aspects may save resources such as bandwidth, processing, or memory. As an example, processing time may be saved through parsing the query for a set of candidate nested code. By modifying the set of nested code, the total number of operations may be reduced. A smaller number of operations to be performed may result in a shorter processing time. Other examples of saving processing time through automated query modification may also be possible.

Figure 8:
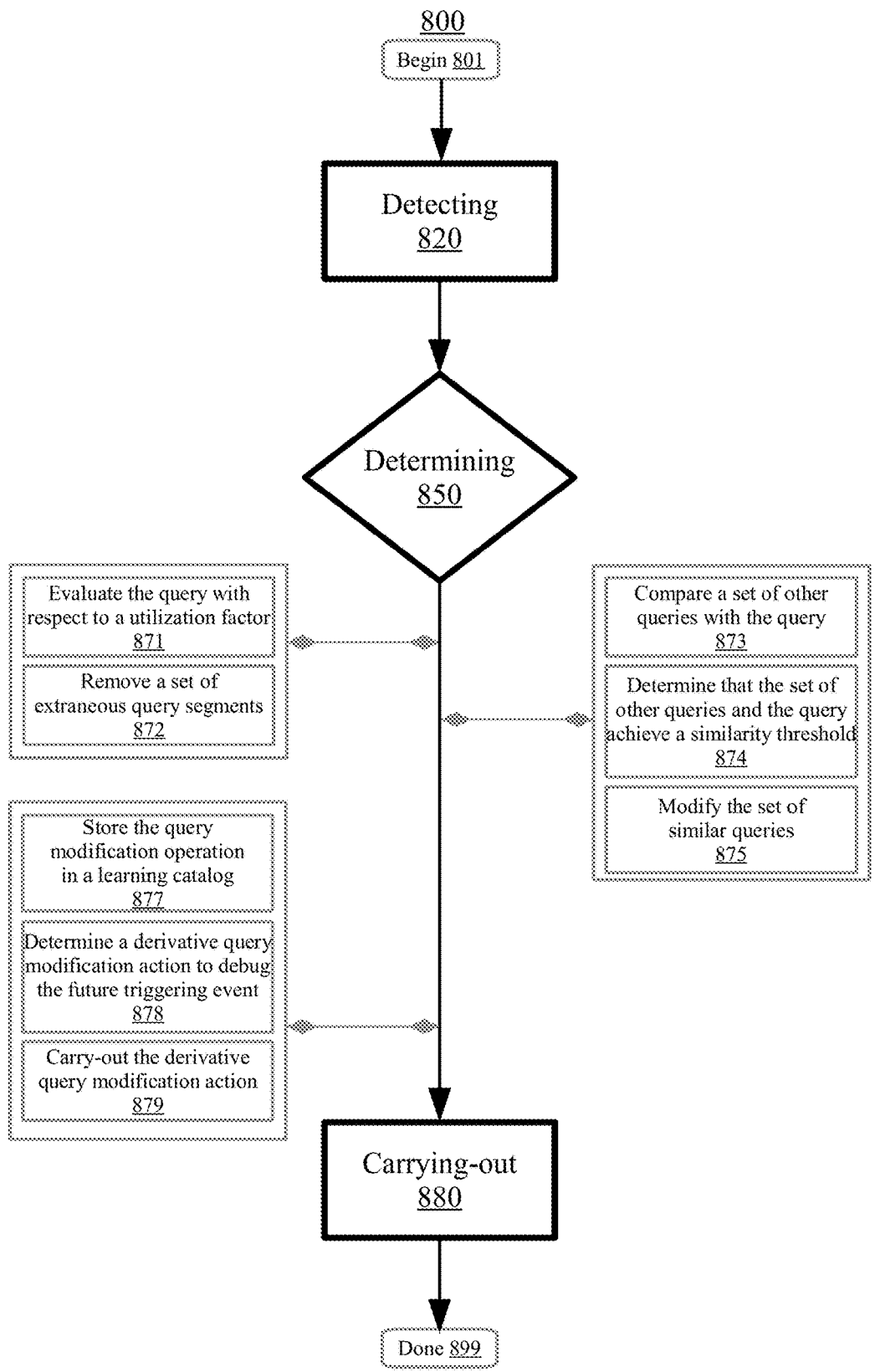
FIG. 8 is a flowchart illustrating a method for automated query modification in a DBMS, according to embodiments.

FIG. 8 is a flowchart illustrating a method 800 for automated query modification in a DBMS. Aspects of method 800 may be similar or the same as aspects of other methods described herein, and aspects may be utilized interchangeably with one or more methodologies described herein. The method 800 may begin at block 801. At block 820, a triggering event related to an execution of a query may be detected. An automated query modification engine may perform the detecting. At block 850, a query modification operation may be determined. The automated query modification engine may perform the determining. The determining may be performed based on a nature of the triggering event. The query modification operation may be determined to debug the triggering event related to the execution of the query. At block 880, the query modification operation may be carried-out. The automated query modification engine may perform the carrying-out. The query modification operation may be carried-out to modify the query. The query may be modified to debug the triggering event related to the execution of the query.

In embodiments, the query may be evaluated at block 871. Generally, evaluating can include examining, analyzing, or otherwise resolving the query. The evaluating may be performed by the automated query modification engine. The query may be evaluated with respect to a utilization factor (e.g., processing, memory) of a set of computing resources. The query may be analyzed in order to evaluate and eliminate parts of the query (e.g., code components, words, operations, functions) which are not required for the running of the query. In embodiments, a set of extraneous query segments may be removed at block 872. Generally, removing can include bypassing, avoiding, ignoring, or otherwise omitting a set of extraneous query segments. The removing may be performed by the automated query modification engine. The removing may occur to reduce the utilization factor of the set of computing resources. A code or a piece of code which is unnecessary or not required (e.g., unrelated, extra, superfluous) may be removed.

Consider the following example. A power company may utilize a DBMS which automatically collects local power outage data. A power outage may be indicated and data may be sent to a DBMS to run a query which alerts the power company of the location of the outage (e.g., REPORT customer_outage). The execution of the query may exceed a threshold temporal period (e.g., the query takes 5 minutes to run compared to a threshold processing time of 1 minute). The query may be evaluated based on processing time and it may be desired to reduce the amount of processing time for the query. A set of extraneous query segments may be removed by the automated query modification engine. As an example, the indication of the power outage may also automatically generate the monthly bills of the particular customer for the past year. The power company may not need the billing information from the customer (e.g., the company needs the address and phone number of the customer, the billing information is extraneous). The automated query modification engine may remove extraneous query segments (e.g., GENERATE monthly_bills_2016). The query may be executed and the address and phone number of the customer experiencing an outage may be reported without also generating the billing history of the customer. The processing time of query execution may be reduced from 5 minutes to 45 seconds. Other methods of removing a set of extraneous query segments may also be possible.

In embodiments, a set of other queries may be compared with the query at block 873. Generally, comparing can include contrasting, assessing, correlating, analyzing, investigating, or otherwise examining a set of other queries. In embodiments, it may be determined that the set of other queries and the query achieve a similarity threshold at block 874. Generally, determining can include sensing, recognizing, detecting, or otherwise ascertaining that the set of queries and the query achieve a similarity threshold. The similarity threshold may include a benchmark value, percentage, range, or the like which indicates the level of likeness between the query and the set of other queries (e.g., the queries have 95% of the same operations, the queries have 105 similar lines of code). In embodiments, the set of similar queries may be modified at block 875. Generally, modifying can include configuring, programming, revising, or otherwise adjusting the set of similar queries. The set of similar queries may be simplified based on the query modification operation for the original query. The modifying may occur in an automated fashion (e.g., without manual/user intervention) based on the query modification operation. Similar queries may be grouped together to perform similar query modification operations.

Consider the following example. A DBMS may automatically execute a query to generate a transaction history report for a user of a credit card who files a complaint with customer service (e.g., GENERATE customer_transaction_report). The query for a particular customer may be executed and it may be determined that the query execution exceeds a threshold level of memory usage (e.g., the query utilizes 300 GB of memory versus a threshold amount of 100 GB). The particular customer may have a large transaction history and the automated query modification engine may determine that only transactions which occurred in the current calendar year may be relevant to customer service. The query may be modified to display only transactions which occurred in the current calendar year (e.g., GENERATE customer_transaction_report_2017). The query may be executed and may utilize a smaller amount of memory (e.g., 71 GB). The query may be compared with a set of other queries (e.g., transaction reports for other credit card users with a large transaction history). The set of other queries may achieve a similarity threshold with the query. As an example, the set of other queries may include customers who used their credit card for a threshold dollar amount of purchases (e.g., $12,000). The set of other queries may include customers who used their credit card for a threshold number of purchases (e.g., 500 purchases). The set of other queries may include customers with a transaction history which achieves a certain percentage of similarity with the data of the particular customer (e.g., transactions are 70% similar/the same). The set of similar queries (e.g., generating transaction histories for other credit card users) may be modified in a similar or the same way as the original query. The similar queries may be modified to only generate a transaction report for the current calendar year. Other examples of modifying a set of similar queries may also occur.

In embodiments, the query modification operation may be stored at block 877. Generally, storing can include depositing, accumulating, or otherwise saving the query modification operation. The query modification operation may be stored with respect to debugging the triggering event related to the execution of the query. The query modification operation may be stored in a learning catalog for future utilization to debug a future triggering event. In embodiments, a derivative query modification action may be determined at block 878. Generally, determining can include resolving, computing, formulating, analyzing, or otherwise ascertaining a derivative query modification action. The determining may be based on the query modification action in the learning catalog. A machine-learning technique may be used to determine query modification actions for future queries. The derivative query modification action may be determined to debug the future triggering event. The future triggering event may be related to the specific query or another future query. In embodiments, the derivative query modification action may be carried-out at block 879 as described herein. A query which fails may be revised and the revision may be stored in a learning catalog. A similar query in the future may be compared to this query and may be modified in a similar method.

Consider the following example. A DBMS may automatically search for any customer of a bank whose checking account reaches a balance of ten dollars or less. The DBMS may automatically send an electronic alert to these customers to indicate a low balance (e.g., SERACH low_balance_account SEND email_alert). A query may be executed to search for customers experiencing a low checking account balance. The query may fail due to a high processing time. The query execution may last 40 minutes as opposed to a threshold temporal period of 15 minutes. The query may be structured to search for both checking and savings accounts when the query only needs to search for checking accounts. The query may be modified such that only checking accounts are taken into consideration (e.g., SEARCH low_balance_checking SEND email_alert). The query modification operation (e.g., eliminate superfluous searches) may be stored in a learning catalog for future utilization to debug a future triggering event (e.g., another query which searches unnecessary accounts for information). A derivative query modification action may be determined to debug the future triggering event. As an example, the derivative query modification action may include the elimination of accounts which are irrelevant to the particular search (e.g., eliminate searches for checking accounts with respect to interest rate information). The derivative query modification action may be carried-out to debug the future triggering event (e.g., the query for searching for interest rate information may eliminate searching checking accounts). The elimination of the superfluous operation may reduce the processing time from 40 minutes to 8 minutes. The processing time for the future queries may also be reduced. Other methods of determining a derivative query modification action to debug a future triggering event may also be possible.

Method 800 concludes at block 899. As described herein, aspects of method 800 relate to automated query modification in a DBMS. Aspects of method 800 may provide performance or efficiency benefits related to automated query modification. Aspects may save resources such as bandwidth, processing, or memory. As an example, comparing a query with a set of other queries may save processing time. A query modification operation for a specific query may be stored in a learning catalog. This operation may be used for a set of other queries which achieve a similarity threshold with the original query. This may prevent the automated query modification engine from having to determine query modification operations for the set of other queries, which may save processing time. Other methods of saving processing time may also be possible.

Consider the following example. An emergency response center may utilize a DBMS. The DBMS may automatically send alerts to emergency response professionals based on the type of professional needed at the location as well as the proximity of the location to the current location of the professional. A query may be executed to search for emergency calls and generate an alert to an emergency professional (e.g., SEARCH emergency, DETERMINE professional, DETERMINE location, GENERATE alert). A triggering event related to an execution of a query may be detected which indicates that the query is taking too long to process (e.g., processing time of 2 minutes). The amount of processing time may be compared with a threshold amount of processing time (e.g., 20 seconds). The execution temporal period may exceed the threshold temporal period. A query modification operation may be determined to reduce the amount of processing time. The query may be parsed to search for a set of candidate superfluous code. As an example, the query may search for all emergencies in the country when only emergencies in a particular state are relevant to the emergency response center. Emergencies in the other 49 states may not need to be searched for and may be considered actual superfluous code. The set of actual superfluous code may be modified to reduce processing time. This may be done by reducing a total number of lines of code (e.g., SEARCH emergency_california instead of SEARCH emergency_california_washington_oregon_nevada_arizona). Reducing the total number of lines of code to modify the set of actual superfluous code may reduce the amount of processing time for the query (e.g., from 2 minutes to 10 seconds). The query may be parsed to search for a set of candidate nested code. As an example, the query may run an additional search for relevant medical concerns or issues of the person or persons experiencing the emergency to communicate information to the emergency response professional. The medical record may take a long amount of time to process and may prevent people experiencing emergencies from getting timely assistance. The additional search may be an unnecessary level of nested code which can be modified to reduce processing time. The query may be modified by reducing the total number of operations (e.g., eliminate the operation FIND medical information). Reducing the total number of operations to modify the set of actual nested code may reduce the amount of processing time for the query (e.g., from 2 minutes to 15 seconds). Other examples of using an automated query modification engine to optimize query performance with respect to one or more computing factors may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for automated query modification in a database management system (DBMS), the method comprising:
    detecting, by an automated query modification engine, a triggering event related to an execution of a query;
    determining, by the automated query modification engine based on a nature of the triggering event, a query modification operation to debug the triggering event related to the execution of the query;
    collecting, with respect to the execution of the query, an execution temporal period value, wherein the execution temporal period value indicates an amount of time required for the query to fail;
    comparing the execution temporal period with a threshold temporal period value, wherein the threshold temporal period value is a benchmark amount of time;
    responsive to determining that the execution temporal period value exceeds the threshold temporal period value and a session level switch is set on for the query, modifying the query to carry-out the query modification operation;
    storing, by the automated query modification engine, the query modification operation in a learning catalog, wherein the stored query modification operation is utilized to debug a future triggering event identical to the triggering event;
    carrying-out, by the automated query modification engine, the query modification operation to modify the query to debug the triggering event related to the execution of the query;
    parsing, the query to search for a set of candidate superfluous code which utilizes a set of computing resources, wherein the superfluous code includes an unnecessary code component;
    identifying, by analyzing the set of candidate superfluous code which utilizes the set of computing resources, a set of actual superfluous code; and
    modifying, to affect a utilization factor of the set of computing resources, the set of actual superfluous code, wherein a total number of operations to be performed by the query is reduced by at least a count operation.

2. The method of claim 1, further comprising:
    analyzing, by the automated query modification engine, the triggering event related to the execution of the query; and
    ascertaining, by the automated query modification engine, the nature of the triggering event.

3. The method of claim 2, further comprising:
    detecting, with respect to the execution of the query, an execution error event;
    identifying that the execution error event includes a memory error event; and
    modifying the query to carry-out the query modification operation.

4. The method of claim 2, further comprising:
    identifying a set of redundant code components of the query; and
    modifying, in an automated fashion which correlates to the set of redundant code components, the query to carry-out the query modification operation.

5. The method of claim 2, further comprising:
    analyzing, by the automated query modification engine, a set of historical run-time detail data with respect to the triggering event related to the execution of the query; and
    ascertaining, by the automated query modification engine, the nature of the triggering event based on the set of historical run-time detail data with respect to the triggering event related to the execution of the query.

6. The method of claim 1, further comprising:
    generating, in response to carrying-out the query modification operation to modify the query to debug the triggering event related to the execution of the query, a set of candidate query plans which includes a derivative query plan, wherein the derivative query plan is both:
        derived from the query, and
        based on the query modification operation;
    selecting, from the set of candidate query plans, the derivative query plan; and
    responding to a database access request using the derivative query plan.

7. The method of claim 1, further comprising:
    finding a suspect segment of the query;
    revising the query including:
        modifying the suspect segment;
    generating, in response to revising the query, a set of fresh query plans;
    selecting, from the set of fresh query plans, a chosen query plan of the set of fresh query plans; and
    responding to a database access request using the chosen query plan.

8. The method of claim 1, further comprising:
    capturing a set of optimizer statistics which relates to an optimizer of the DBMS;
    determining, using the set of optimizer statistics, the query modification operation to debug the triggering event related to the execution of the query; and
    modifying, in response to using the set of optimizer statistics to determine the query modification action, the query to carry-out the query modification operation.

9. The method of claim 1, further comprising:
    reducing, by modifying the set of actual superfluous code, a total number of operations to be performed by the query.

10. The method of claim 1, further comprising:
    reducing, by modifying the set of actual superfluous code, a total number of lines of code.

11. The method of claim 1, further comprising:
    parsing, to search for a set of candidate nested code which utilizes a set of computing resources, the query;

identifying, by analyzing the set of candidate nested code which utilizes the set of computing resources, a set of actual nested code; and modifying, to effect a utilization factor of the set of computing resources, the set of actual nested code.

12. The method of claim 11, further comprising:

reducing, by modifying the set of actual nested code, a total number of operations to be performed by the query.

13. The method of claim 1, further comprising:

evaluating, by the automated query modification engine, the query with respect to a utilization factor of a set of computing resources; and removing, by the automated query modification engine to reduce the utilization factor of the set of computing resources, a set of extraneous query segments.

14. The method of claim 1, further comprising:

comparing a set of other queries with the query;

determining that the set of other queries and the query achieve a similarity threshold; and modifying, in an automated fashion based on the query modification operation, the set of similar queries.

15. The method of claim 1, further comprising:

determining, based on the query modification action in the learning catalog, a derivative query modification action to debug the future triggering event; and carrying-out the derivative query modification action.

16. A system for automated query modification in a database management system (DBMS), the system comprising:

a memory having a set of computer readable computer instructions, and a processor for executing the set of computer readable instructions, the set of computer readable instructions including:

detecting, by an automated query modification engine, a triggering event related to an execution of a query;

determining, by the automated query modification engine based on a nature of the triggering event, a query modification operation to debug the triggering event related to the execution of the query;

collecting, with respect to the execution of the query, an execution temporal period value, wherein the execution temporal period value indicates an amount of time required for the query to fail;

comparing the execution temporal period with a threshold temporal period value, wherein the threshold temporal period value is a benchmark amount of time;

responsive to determining that the execution temporal period value exceeds the threshold temporal period value and a session level switch is set on for the query, modifying the query to carry-out the query modification operation;

storing, by the automated query modification engine, the query modification operation in a learning catalog, wherein the stored query modification operation is utilized to debug a future triggering event identical to the triggering event;

carrying-out, by the automated query modification engine, the query modification operation to modify the query to debug the triggering event related to the 'execution of the query;

parsing, the query to search for a set of candidate superfluous code which utilizes a set of computing resources, wherein the superfluous code includes an unnecessary code component;

identifying, by analyzing the set of candidate superfluous code which utilizes the set of computing resources, a set of actual superfluous code; and modifying, to affect a utilization factor of the set of computing resources, the set of actual superfluous code, wherein a total number of operations to be performed by the query is reduced by at least a count operation.

17. A computer program product for automated query modification in a database management system (DBMS), the computer program product comprising a computer readable storage medium having program instructions embodied therewith, wherein the computer readable storage medium is not a transitory signal per se, the program instructions executable by a processor to cause the processor to perform a method comprising:

detecting, by an automated query modification engine, a triggering event related to an execution of a query;

determining, by the automated query modification engine based on a nature of the triggering event, a query modification operation to debug the triggering event related to the execution of the query;

collecting, with respect to the execution of the query, an execution temporal period value, wherein the execution temporal period value indicates an amount of time required for the query to fail;

comparing the execution temporal period with a threshold temporal period value, wherein the threshold temporal period value is a benchmark amount of time;

responsive to determining that the execution temporal period value exceeds the threshold temporal period value and a session level switch is set on for the query, modifying the query to carry-out the query modification operation;

storing, by the automated query modification engine, the query modification operation in a learning catalog, wherein the stored query modification operation is utilized to debug a future triggering event identical to the triggering event;

carrying-out, by the automated query modification engine, the query modification operation to modify the query to debug the triggering event related to the execution of the query;

parsing, the query to search for a set of candidate superfluous code which utilizes a set of computing resources, wherein the superfluous code includes an unnecessary code component;

identifying, by analyzing the set of candidate superfluous code which utilizes the set of computing resources, a set of actual superfluous code; and modifying, to affect a utilization factor of the set of computing resources, the set of actual superfluous code, wherein a total number of operations to be performed by the query is reduced by at least a count operation.

* * * * *